(12) United States Patent
Lee et al.

(10) Patent No.: US 7,016,275 B1
(45) Date of Patent: Mar. 21, 2006

(54) OPTICAL RECORDING MEDIUM ON WHICH DATA MAY BE STORED SEAMLESSLY AND METHOD FOR PROCESSING DEFECTIVE AREA WITHIN THE MEDIUM

(75) Inventors: Kyung-geun Lee, Sungnam (KR); Young-yoon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/556,620

(22) Filed: Apr. 21, 2000

(30) Foreign Application Priority Data

Apr. 21, 1999 (KR) ................................ 1999-14285

(51) Int. Cl.
*G11B 5/09* (2006.01)
(52) U.S. Cl. ................................ 369/47.14; 369/275.3
(58) Field of Classification Search ............ 369/44.26, 369/44.32, 44.33, 47.14, 53.15, 53.17, 59.12, 369/275.3
See application file for complete search history.

(56) References Cited

U.S. PATENT DOCUMENTS

| | | | | |
|---|---|---|---|---|
| 4,742,507 A | | 5/1988 | Kuroki et al. ................. | 369/54 |
| 4,768,181 A | | 8/1988 | Ichinose et al. ............... | 369/54 |
| 5,235,585 A | * | 8/1993 | Bish et al. ................. | 369/53.17 |
| 5,420,838 A | | 5/1995 | Maeda et al. ................. | 369/32 |
| 5,442,638 A | | 8/1995 | Awad et al. ............ | 395/182.04 |
| 5,553,045 A | | 9/1996 | Obata .......................... | 369/58 |
| 5,745,444 A | * | 4/1998 | Ichikawa et al. ........ | 369/13.28 |
| 5,914,928 A | * | 6/1999 | Takahashi ................. | 369/47.14 |
| 5,966,358 A | * | 10/1999 | Mine ....................... | 369/47.14 |
| 6,034,831 A | * | 3/2000 | Dobbek et al. ............... | 360/53 |
| 6,049,515 A | * | 4/2000 | Yamamuro ............... | 369/47.14 |
| 6,272,085 B1 | * | 8/2001 | Maeda .................... | 369/53.17 |
| 6,418,100 B1 | * | 7/2002 | Park et al. ............... | 369/47.14 |
| 6,546,192 B1 | * | 4/2003 | Hisatomi et al. ............. | 386/70 |
| 6,564,338 B1 | * | 5/2003 | Sasaki et al. ............ | 369/275.3 |

FOREIGN PATENT DOCUMENTS

| | | |
|---|---|---|
| JP | 61-283091 | 12/1986 |
| JP | 2-20141 | 1/1987 |
| JP | 62-170049 | 7/1987 |
| JP | 2035663 A * | 2/1990 |
| JP | 7-29312 | 1/1995 |
| JP | 9-265733 | 10/1997 |
| JP | 10-149633 | 6/1998 |
| JP | 9-63203 | 8/1998 |
| WO | WO98/36414 | 8/1998 |

* cited by examiner

*Primary Examiner*—Paul W. Huber
(74) *Attorney, Agent, or Firm*—Stein, McEwen & Bui, LLP

(57) ABSTRACT

An optical recording medium on which data may be stored seamlessly, and a method of processing a defective area in the optical recording medium are provided. In a recording medium in which basic recording units are seamlessly recorded, such as a digital versatile disc rewritable (DVD-RW) on which data can be repeatedly recorded and reproduced multiple times, defective areas occurring before or during use are detected, and a list of the defective areas is recorded in a predetermined area of the recording medium. Thereafter, while user data is being recorded, instead of slipping (lowering optical power in) the defective areas registered in the defective area list, dummy data is recorded in the defective areas, basic unit data from an area preceding or succeeding a defective area is repeatedly recorded in the defective area, or a predetermined data pattern is recorded in the defective area. This suppresses linking caused by the interruption of data recording, thereby ensuring a maximum user area.

36 Claims, 3 Drawing Sheets

| SECTOR | FIELD | CONTENTS |
|---|---|---|
| 0 | | LINKING LOSS AREA |
| 1 | 0 | GENERAL INFORMATION OF DISC |
| 2 | 1 | OPC RELATED INFORMATION |
| 3 | 2 | USER SPECIFIC DATA |
| 4 | 3 | BORDER ZONE INFORMATION |
| 5 | 4 | RZONE INFORMATON |
| 6 | 5 | |
| 7 | 6 | |
| 8 | 7 | |
| 9 | 8 | DEFECT STATUS BITMAP |
| 10 | 9 | |
| 11 | 10 | |
| 12 | 11 | |
| 13 | 12 | |
| 14 | 13 | RESERVED |
| 15 | 14 | |

FIG. 2

| SECTOR | FIELD | CONTENTS |
|---|---|---|
| 0 | | LINKING LOSS AREA |
| 1 | 0 | GENERAL INFORMATION OF DISC |
| 2 | 1 | OPC RELATED INFORMATION |
| 3 | 2 | USER SPECIFIC DATA |
| 4 | 3 | BORDER ZONE INFORMATION |
| 5 | 4 | RZONE INFORMATON |
| 6 | 5 | DEFECT STATUS BITMAP |
| 7 | 6 | |
| 8 | 7 | |
| 9 | 8 | |
| 10 | 9 | |
| 11 | 10 | |
| 12 | 11 | |
| 13 | 12 | |
| 14 | 13 | RESERVED |
| 15 | 14 | |

OPTICAL RECORDING MEDIUM ON WHICH DATA MAY BE STORED SEAMLESSLY AND METHOD FOR PROCESSING DEFECTIVE AREA WITHIN THE MEDIUM

CROSS-REFERENCE TO RELATED APPLICATIONS

This application claims the benefit of Korean Application No. 99-14285, filed Apr. 21, 1999, in the Korean Patent Office, the disclosure of which is incorporated herein by reference.

BACKGROUND OF THE INVENTION

1. Field of the Invention

The present invention relates to a writable/rewritable optical recording medium, and more particularly, to an optical recording medium such as a digital versatile disc rewritable (DVD-RW) on which basic recording units are seamlessly connected, and a method of processing a defective area occurring on the recording medium.

2. Description of the Related Art

Conventionally, the management of defects on a writable/rewritable disc is performed only for DVD-random access memory (DVD-RAM). For a defect (primary defect) occurring while a disc is being initialized, a method of slipping replacement is used to slip the defective area without allocating a logical sector number. For a defect (secondary defect) occurring while a disc is being used, a linear replacement technique is used to replace an error correction code (ECC) block including the defective area with a normal ECC block within a spare area.

A DVD-RW, on the other hand, has a recording management data (RMD) area for recording a list of detected defective areas, but a detailed method of detecting defective areas (for example, a certification method) is not defined by any standard. Accordingly, such a method of processing defective areas is needed.

Unlike a DVD-RAM in which basic recording units are discriminated from the others by physical identifiers (PIDs) or a buffer field (a spare area assigned for overcoming the limit caused by accurate control of the spindle motor), in a DVD-RW, basic recording units are seamlessly recorded without discrimination, so it is necessary to clarify the start point of each basic recording unit. The basic recording unit of a DVD-RAM may be a sector, and the basic recording unit of a DVD-RW may be an ECC block.

The three recording modes of a DVD-RW disc are: disc at once recording mode, overwriting recording mode and incremental recording mode.

When recording in any of these three modes is resumed after having been interrupted, DVD recordables (DVD-Rs) and DVD-RWs, which have the same physical format, employ a linking scheme having 5 bytes of margin for a next recording start point. However, a user data area may be lost when using the linking scheme.

SUMMARY OF THE INVENTION

To solve the above problem, a first object of the present invention is to provide an optical recording medium for storing a data pattern for a defective area in a physically defective area without using a linking scheme wherein basic recording units are seamlessly connected in the optical recording medium.

A second object of the present invention is to provide a method of processing a defective area without loss of a user area and without using a linking scheme in a recording medium in which basic recording units are seamlessly connected.

Additional objects and advantages of the invention will be set forth in part in the description which follows and, in part, will be obvious from the description, or may be learned by practice of the invention.

To achieve the first and other objects, the present invention provides an optical recording medium to which data can be written and rewritten and in which basic recording units are seamlessly connected. Information, which is related to a defective area occurring before user data is recorded on the optical recording medium or while the optical recording medium is being used, is recorded in a predetermined area, and a defective area data pattern is recorded in the defective area during the recording of user data, so that seamless recording of data can be achieved.

To achieve the second and other objects, the present invention provides a method of processing a defective area in an optical recording medium to which data can be written and rewritten and in which basic recording units are seamlessly connected, the processing taking place in a recording and reproduction apparatus. The method includes recording a defective area data pattern in the defective area on the optical recording medium to allow seamless recording of data during recording of user data.

BRIEF DESCRIPTION OF THE DRAWINGS

The above objects and advantages of the present invention will become more apparent by describing in detail preferred embodiments thereof with reference to the attached drawings in which:

FIG. 2 is a diagram showing the contents of a recording management data (RMD) field for storing defective area information in a DVD-RW according to an embodiment the present invention;

DESCRIPTION OF THE PREFERRED EMBODIMENTS

Reference will now be made in detail to the present preferred embodiments of the present invention, examples of which are illustrated in the accompanying drawings.

Figure 1:
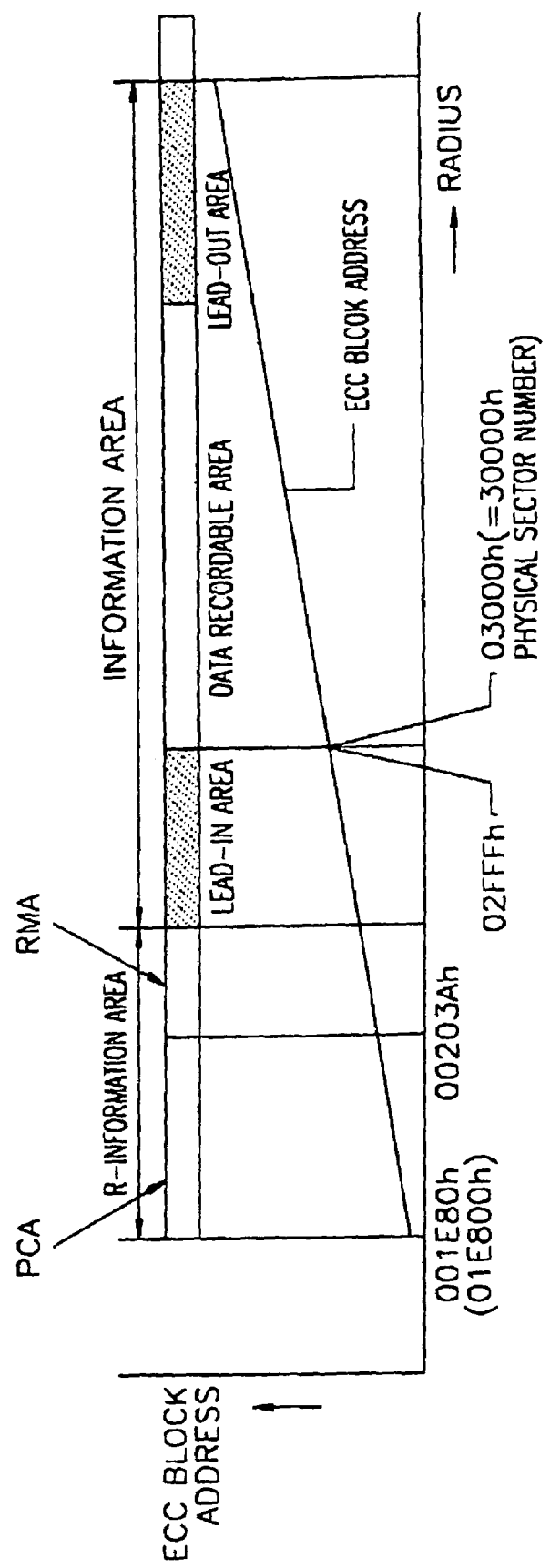
FIG. 1 is a diagram showing the first dimensional structure of a typical digital versatile disc rewritable (DVD-RW)

FIG. 1 illustrates the overall layout of a typical digital versatile disc rewritable (DVD-RW). A DVD-RW is largely divided into two areas with respect to function: a recording (R)-information area and an information area. The R-information area is divided into a power calibration area (PCA) for adjustment of power and a recording management area (RMA) containing all the information related to recording such as disc recording mode, recording state, optimum power adjustment and border zone information. The information area is divided into a lead-in area, a data recordable area in which a user can write information and a lead-out area, the content of which is not yet defined by the DVD-RW standard.

FIG. 2 shows the structure of recording management data (RMD) fields storing defective area information according to an embodiment of the present invention within an RMA in a DVD-RW which is currently undergoing standardization. Referring to FIG. 2, the RMD comprises 16 sectors. The first sector is assigned as a linking loss area. RMD field 0 stores general information of the disc. RMD field 1 stores optimum power control (OPC) related information. RMD field 2 stores information for user specific data (the content is 00h). RMD field 3 stores border zone information. RMD field 4 stores recording (R) zone information containing recording items. RMD fields 13 and 14 are reserved ones. RMD fields 5 through 12 are assigned for storing information related to defect management and certification, including certification before the disc is used and management of defects occurring while the disc is being used.

In certification before the disc is used, a predetermined recording pattern is written to a data identifier (DID) area and data recordable area, which are located at the beginning portion of each groove track of the disc according to a predetermined rule and then reproduced to detect defective areas in units of a sector or an error correction code (ECC) block. Finally, defect status bitmap information is recorded in the assigned area, RMD fields 5 through 12.

Figure 3A:
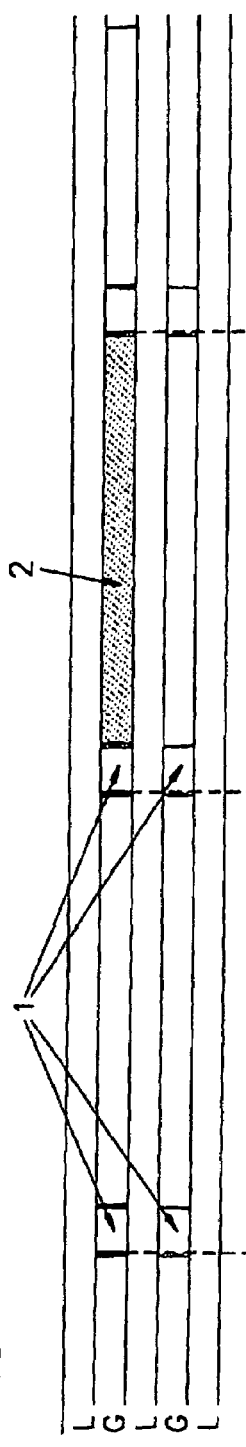
FIG. 3A is a diagram showing part of a disc which has undergone certification of defective areas before the disc is used or while the disc is being used.

FIG. 3A schematically shows the state of a disc after certification, or a disc which is currently being used. Unlike in a DVD-RAM, in a DVD-RW, the structure of data written to a groove track G is seamless and does not include any physical identifier (PID) nor a buffer field. "L" indicates a land track. When data recording in the DVD-RW is interrupted even for just a moment in the disc at once recording mode, the overwriting recording mode or the incremental recording mode, it is difficult to accurately locate the point at which to restart recording. To solve this problem, conventional technology uses a linking scheme assigning a linking sector of 5 bytes to serve as a connection range. This method is advantageous in terms of reliability of data but disadvantageous in that the user area is reduced.

Figure 3B:
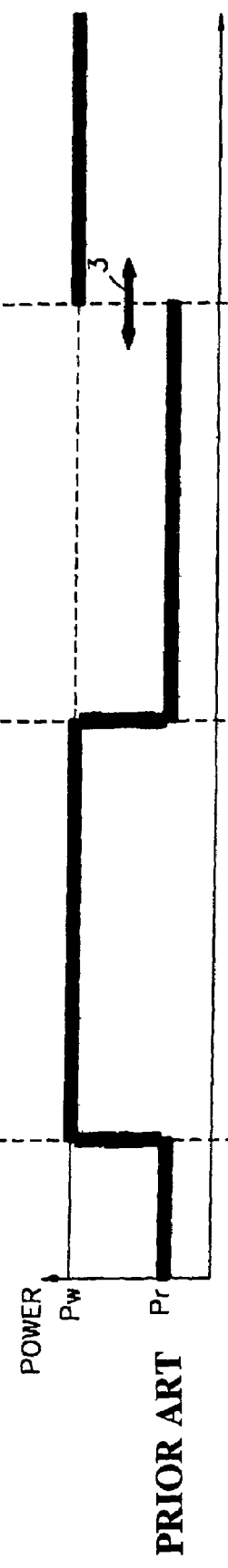
FIG. 3B is a diagram showing a case in which laser power is lowered to a read power Pr in a defective area only and then increased to a write power Pw.
Figure 3C:
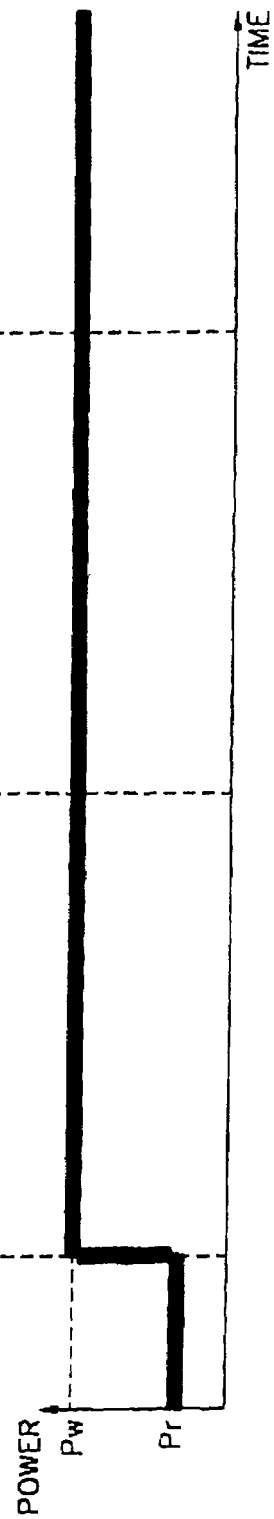
FIG. 3C is a diagram showing a case in which the laser power is maintained at the write power Pw even in the defective area according to the embodiment of the present invention shown in FIG. 2.

In an embodiment of the present invention, during certification or when a user actually records data after the certification, if a defective area (or bad area) 2, as shown in FIG. 3A, corresponding to the defective area information registered in the RMD appears, meaningless dummy data is stored in the defective area without momentary reduction of laser power, data recorded in a predetermined area (e.g., a basic recording unit) preceding or succeeding the defective area is repeatedly recorded in the defective area, or a predetermined data pattern for indicating defective areas is recorded in the defective area. At all times, write power Pw is maintained as shown in FIG. 3C, thereby restraining the occurrence of linking during recording in any of the disc at once recording mode, the overwriting recording mode and the incremental recording mode. The predetermined data pattern may be a recording pattern previously defined by a drive manufacturer. Dummy data, duplication data and a predetermined data pattern can each be referred to as a defective area data pattern.

When a user records data after certification, the sector number of a DID 1 may be the same as the physical sector number used during the certification or may be any logical sector number except for those of bad areas. The DID 1 may be further stored information (e.g., a flag) for discriminating user data from defective area data pattern which is recorded in a corresponding sector.

Conventionally, optical power emitted from a light source such as a laser is lowered to a power not influencing the recording, for example, less that or equal to a read power Pr, causing a time delay in the recording process corresponding to the defective area. This is shown in FIG. 3B for the case of the defective area 2 first shown in FIG. 3A. In this case, when a DID 1 next to the defective area 2 is detected and recording is resumed thereafter, a time shift occurs at point 3 at which recording is recommenced, so that the point 3 at which recording is actually recommenced cannot exactly match with a recording start position which is indicated by a land pre-pit (LPP) including physical position information. In the case of a DVD-RW, data can be written only to a groove track, and pre-pit information indicating a physical ECC block number is written to a land track.

To solve these problems, the embodiment of the present invention described above records a defective area data pattern in a defective area and does not lower write power in the defective area, as shown in FIG. 3C. In another embodiment, when laser power is lowered in a defective area and data is recorded in an adjacent non-defective area after slipping the defective area in an incremental recording mode, a wobble signal having a fixed frequency at the track pitch or some other reference signal related to time is used, thereby minimizing the problem of the time shift. In other words, an accurate recording start point can be exactly detected by counting wobble signals or reference signals.

In the above preferred embodiments of the present invention, the DVD-RW is taken as an example, but the present invention can be adopted in a DVD recordable (DVD-R) or any recording medium in which the basic recording units are seamlessly connected. The present invention can also be effectively adopted in a disc used in a disc at once recording mode, an overwriting recording mode and an incremental recording mode.

According to the present invention, during the certification or use of a recording medium having seamlessly connected basic recording units, a predetermined pattern having no relation with user data is recorded in a defective area instead of slipping the defective area, thereby preventing linking caused by the interruption of data recording. Consequently, the present invention ensures a maximum user area.

In addition, even in the case of slipping a defective area after lowering laser power in the defective area and resuming data recording in an adjacent non-defective area, the present invention uses a reproduced wobble signal or other reference signal to detect the exact recording restart point, thereby improving the reliability of the system.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A medium to which user data is written and rewritten, comprising:
   basic recording units in which the user data are seamlessly connected; and
   a predetermined area in which information, which is related to a defective area that could be detected before the user data is recorded on the medium and while the medium is being used after certification of the medium, is recorded;

wherein a defective area data pattern is recorded in the defective area during the recording of the user data for seamless recording.

2. The medium of claim 1, wherein the defective area data pattern is dummy data.

3. The medium of claim 1, wherein the defective area data pattern is the same as data in the part of an area preceding or succeeding the defective area.

4. The medium of claim 1, wherein the defective area data pattern is defined by a drive manufacturing company.

5. A medium to which user data is written and rewritten, comprising:

basic recording units in which the user data are seamlessly recorded; and a predetermined area in which information, which is related to a defective area detected while the medium is being used after certification of the medium, is recorded;

wherein a defective area data pattern other than the user data is recorded in the defective area between adjacent recorded user data or during the recording of the user data for seamless recording.

6. A medium to which user data is written and rewritten, comprising:

basic recording units in which the user data are seamlessly connected;

a predetermined area in which information, which is related to a defective area occurring before the user data is recorded on the medium or while the medium is being used, is recorded; and a data identifier (DID) area or data recordable area in which a recording pattern defined by a predetermined rule is recorded to detect a defective area before the user data is recorded on the medium, and while the user data is being recorded, a physical sector number is recorded in the data identifier area, wherein a defective area data pattern is recorded in the defective area during the recording of the user data for seamless recording.

7. The medium of claim 6, wherein the data identifier area stores information for discriminating the user data from the defective area data pattern recorded in a corresponding sector of the medium.

8. A medium to which user data is written and rewritten, comprising:

basic recording units in which the user data are seamlessly connected;

a predetermined area in which information, which is related to a defective area occurring before the user data is recorded on the medium or while the medium is being used, is recorded; and a data identifier (DID) area or data recordable area to detect a defective area before the user data area is recorded on the medium, and while the user data is being recorded, a logical sector number which is not assigned to the defective area is recorded in the data identifier area, wherein a defective area data pattern is recorded in the defective area during the recording of the user data for seamless recording.

9. The medium of claim 8, wherein the data identifier area stores information for discriminating the user data from the defective area data pattern recorded in a corresponding sector of the medium.

10. A medium to which user data is written and rewritten, comprising:

basic recording units in which the user data are seamlessly connected; and a predetermined area in which information, which is related to a defective area detected before the user data is recorded on the medium or while the medium is being used, is recorded;

wherein a defective area data pattern is recorded in the defective area during the recording of the user data for seamless recording, and wherein the recording medium is a digital versatile disc recordable (DVD-R) or a digital versatile disc rewritable (DVD-RW), and information related to the defective area is stored in a recording management data area.

11. A medium to which user data is written and rewritten, comprising:

basic recording units in which the user data are seamlessly connected; and a predetermined area in which information, which is related to a defective area detected before the user data is recorded on the medium or while the medium is being used, is recorded;

wherein a defective area data pattern is recorded in the defective area during the recording of the user data for seamless recording, and wherein optical power is maintained at write power in the defective area during recording of user data.

12. A medium to which user data is written and rewritten, comprising:

basic recording units in which the user data are seamlessly connected, and including a defective area detected before the user data is recorded; and a defective area data pattern recorded in the defective area without using a linking scheme.

13. A medium to which user data is written and rewritten, comprising:

basic recording units in which the user data are seamlessly connected, and including a defective area;

a defective area data pattern recorded in the defective area without using a linking scheme; and a predetermined area which stores information related to the defective area occurring before the user data is recorded or while the medium is being used.

14. The medium of claim 13, wherein the predetermined area comprises a recording management field which includes a linking loss area;

general information of the medium;

optimum power control related information;

information for user specific data;

border zone information;

recording zone information containing recording items;

reserved areas; and information related to defect management and certification, including certification before the medium is used and management of defects occurring while the medium is being used.

15. The medium of claim 13, wherein the defective area data pattern is dummy data.

16. The medium of claim 13, wherein the defective area data pattern is the same as data in the basic recording units in an area immediately preceding or succeeding the defective area.

17. The medium of claim 13, wherein the defective area data pattern is a pattern defined by a manufacturer.

18. A method of handling a defective area in a medium to which user data is written and rewritten, comprising:
   recording basic recording units in which the user data are seamlessly connected, on a region of the medium having a defective area detected before the user data is recorded; and
   recording a defective area data pattern in the defective area without using a linking scheme.

19. A method of processing a defective area in a medium to which user data is written and rewritten and in which basic recording units are seamlessly connected, the method comprising:
   recording a defective area data pattern in the defective area on the medium, detected before the user data area is recorded and after certification of the medium, to enable seamless recording of the user data during recording of the user data.

20. A method of processing a defective area in a medium to which user data is written and rewritten and in which basic recording units are seamlessly connected, the method comprising:
   recording a defective area data pattern in the defective area on the medium to enable seamless recording of the user data during recording of the user data,
   wherein the recording of the defective area data pattern comprises maintaining a write power to record the defective area data pattern in the defective area from recording the user data immediately prior to and subsequent to recording the defective area data pattern.

21. The method of claim 19, wherein the defective area data pattern is dummy data.

22. The method of claim 19, wherein the defective area data pattern is the same as data in a basic recording unit preceding or succeeding the defective area.

23. The method of claim 19, wherein the defective area data pattern is defined by a drive manufacturing company.

24. A method of processing a defective area in a medium to which user data is written and rewritten and in which basic recording units are seamlessly connected, the method comprising:
   recording a defective area data pattern in the defective area on the medium to enable seamless recording of the user data during recording of the user data;
   detecting the defective area occurring while the medium is being used after certification of the medium; and
   recording information related to the detected defective area in a predetermined area on the medium.

25. A method of processing a defective area in a medium to which user data is written and rewritten and in which basic recording units are seamlessly connected, the method comprising:
   recording a defective area data pattern in the defective area on the medium to enable seamless recording of the user data during recording of the user data;
   detecting the defective area occurring before the user data is recorded on the medium or while the medium is being used; and
   recording information related to the detected defective area in a predetermined area on the medium,
   wherein the detecting of the defective area comprises detecting the defective area before the user data is recorded on the medium, by certification, wherein the certification is performed by recording a recording pattern defined by a predetermined rule in a data identifier (DID) area or data recordable area of the medium.

26. The method of claim 25, wherein the recording of the defective area data pattern comprises recording a physical sector number in the data identifier area during the recording of the user data.

27. The method of claim 26, further comprising storing information for discriminating the user data from the defective area data pattern recorded in a corresponding sector in the data identifier area.

28. The method of claim 25, wherein the recording a defective area data pattern comprises recording a logical sector number which is not assigned to the defective area in the data identifier area.

29. The method of claim 28, further comprising storing information for discriminating the user data from the defective area data pattern in a corresponding sector in the data identifier area.

30. A method of processing a defective area in a medium to which user data is written and rewritten and in which basic recording units are seamlessly connected, the method comprising:
   recording a defective area data pattern in the defective area on the medium to enable seamless recording of the user data during recording of the user data;
   detecting the defective area occurring before the user data is recorded on the medium or while the medium is being used; and
   recording information related to the detected defective area in a predetermined area on the medium,
   wherein the recording medium is a digital versatile disc recordable (DVD-R) or a digital versatile disc rewritable (DVD-RW), and the recording of the information related to the detected defective area comprises storing the information related to the defective area in a recording management data area of the medium.

31. A method of processing a defective area in a medium to which user data is written and rewritten and in which basic recording units are seamlessly connected, the medium having a wobble track, the method comprising:
   (a) during the recording of the user data, lowering a write power of a light source to a power not influencing the recording in a defective area of the medium and recording the user data in a recordable area of the medium other than the defective area with the write power, and detecting a recording restart position of a user data area immediately after the defective area is detected using a wobble signal obtained from the wobbled track.

32. The method of claim 31, wherein operation (a) comprises detecting the recording restart position using a reference signal related to time.

33. The method of claim 31, further comprising:
   detecting the defective area occurring before the user data is recorded in the medium or while the medium is being used; and
   recording information related to the defective area in a predetermined area on the medium.

34. A method of handling a defective area in a medium to which user data is written and rewritten, comprising:
   recording basic recording units in which the user data are seamlessly connected, on a region of the medium having a defective area; and
   recording a defective area data pattern in the defective area without using a linking scheme,
   wherein the recording of the basic recording units and the defective area comprise:
   recording the user data in the basic recording units up to the defective area using a write power;

maintaining the write power while recording the defective area data pattern in the defective area; and maintaining the write power while recording the user data in the basic recording units following the defective area.

35. The method of claim 34, further comprising:

recording information related to the defective area occurring before the user data is recorded or while the medium is being used in a predetermined area of the medium distinct from the region storing the basic recording units.

36. A method of handling a defective area in a medium to which user data is written and rewritten, comprising:

recording the user data in basic recording units in which the user data are seamlessly connected, on a region of the medium having a defective area, up to the defective area using a first write power;

lowering the first write power to a second power less than a read power of the user data while in the defective area;

determining a wobble signal from a wobbled track of the medium; and determining a recording restart position for the user data immediately after the defective area using the wobble signal.

* * * * *

UNITED STATES PATENT AND TRADEMARK OFFICE
CERTIFICATE OF CORRECTION

PATENT NO. : 7,016,275 B1  Page 1 of 1
APPLICATION NO. : 09/556620
DATED : March 21, 2006
INVENTOR(S) : Kyung-geun Lee et al.

It is certified that error appears in the above-identified patent and that said Letters Patent is hereby corrected as shown below:

Title Page, Item (56) References Cited, Foreign Documents, change
"JP 2-20141    1/1987" to
--JP 62-20141   1/1987--.

Signed and Sealed this

Twenty-first Day of November, 2006

JON W. DUDAS
*Director of the United States Patent and Trademark Office*